(12) United States Patent
Kanei et al.

(10) Patent No.: US 11,620,675 B2
(45) Date of Patent: Apr. 4, 2023

(54) DETECTOR, DETECTION METHOD, AND DETECTION PROGRAM

(71) Applicant: NIPPON TELEGRAPH AND TELEPHONE CORPORATION, Tokyo (JP)

(72) Inventors: Fumihiro Kanei, Musashino (JP); Daiki Chiba, Musashino (JP); Yuta Takata, Musashino (JP); Mitsuaki Akiyama, Musashino (JP); Kunio Hato, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/278,673

(22) PCT Filed: Apr. 10, 2019

(86) PCT No.: PCT/JP2019/015708
§ 371 (c)(1),
(2) Date: Mar. 23, 2021

(87) PCT Pub. No.: WO2020/066084
PCT Pub. Date: Apr. 2, 2020

(65) Prior Publication Data
US 2022/0036402 A1    Feb. 3, 2022

(30) Foreign Application Priority Data

Sep. 25, 2018   (JP) .............................. JP2018-179229

(51) Int. Cl.
G06Q 30/02      (2012.01)
G06F 16/955     (2019.01)
G06Q 30/0241    (2023.01)

(52) U.S. Cl.
CPC ....... *G06Q 30/0248* (2013.01); *G06F 16/955* (2019.01); *G06Q 30/0277* (2013.01)

(58) Field of Classification Search
CPC ............ G06Q 30/0248; G06Q 30/0277; G06F 16/955
See application file for complete search history.

(56) References Cited

U.S. PATENT DOCUMENTS 10,333,964 B1 *  6/2019  Freeman .............. H04L 63/1425
10,387,911 B1 *  8/2019  Shaw .................. G06Q 30/0248
(Continued)

FOREIGN PATENT DOCUMENTS

JP       2008-135030 A     6/2008

OTHER PUBLICATIONS

An Ensemble Learning Based Approach for Fmpression Fraud Detection in Mobile Advertising, Ch. Md. Rakin Haider et al., Journal of Network and Computer Applications, vol. 112, (2018).*
(Continued)

*Primary Examiner* — Ilana L Spar
*Assistant Examiner* — Allan J Woodworth, II
(74) *Attorney, Agent, or Firm* — Xsensus LLP

(57) ABSTRACT

A feature extraction unit extracts, from an advertising request to view an online advertisement, client information on a client as a transmission source of the advertising request and publisher information on a website of a publisher who displays advertising, and calculates a predetermined feature amount using the client information and the publisher information with respect to a plurality of advertising requests including at least a benign advertising request, and a determiner generation unit generates a determiner that determines whether an advertising request is malignant or not by using the calculated feature amount.

6 Claims, 8 Drawing Sheets

(56) References Cited

U.S. PATENT DOCUMENTS

| | | | |
|---|---|---|---|
| 2008/0126159 A1 | 5/2008 | Wee et al. | |
| 2008/0301116 A1* | 12/2008 | Wang | G06F 16/951 707/999.005 |
| 2010/0082400 A1 | 4/2010 | Bagherjeira et al. | |
| 2011/0199902 A1* | 8/2011 | Leavy | H04L 47/22 370/232 |
| 2013/0226692 A1* | 8/2013 | Kouladjie | G06Q 30/02 705/14.45 |
| 2018/0253755 A1 | 9/2018 | Cheng et al. | |
| 2019/0130440 A1* | 5/2019 | Qiu | G06Q 30/0248 |

OTHER PUBLICATIONS

Haider et al., "An Ensemble Learning Based Approach for Impression Fraud Detection in Mobile Advertising", Journal of Network and Computer Applications, vol. 112, Mar. 27, 2018, pp. 126-141.

Kanei et al., An Empirical Analysis of Online Advertising Fraud by Analyzing User Activities Observed in the Ad Network, IEICE Technical Report, vol. 117, Feb. 28, 2018, No. 481, pp. 97-102.

Stone-Gross et al., "Understanding Fraudulent Activities in Online Ad Exchanges", Proceedings of the 2011 ACM SIGCOMM Conference on Internet Measurement Conference (IMC), Nov. 2-4, 2011, pp. 279-294.

Dave et al., "ViceROI: Catching Click-Spam in Search Ad Networks", Proceedings of the 2013 ACM SIGSAC Conference on Computer and Communications Security (CCS), Nov. 4-8, 2013, pp. 765-776.

English translation of the International Search Report and Written Opinion.

Extended European search report dated Apr. 5, 2022, in corresponding European patent Application No. 19867456.6, 7 pages.

Richard Oentaryo et al., "Detecting Click Fraud in Online Advertising: A Data Mininag Approach", Journal of Machine Learning Research, vol. 15, 2014, pp. 99-140.

Wikipedia, "Statistical classification", May 28, 2018, total 6 pages. URL: https://en.wikipedia.org/w/index.php?title=Statistical_classification&oldid=843354472.

Wikipedia, "User agent", Jul. 17, 2018, total 5 pages. URL: https://en.wikipedia.org/w/index.php?title=User_agent&oldid=850650072.

* cited by examiner

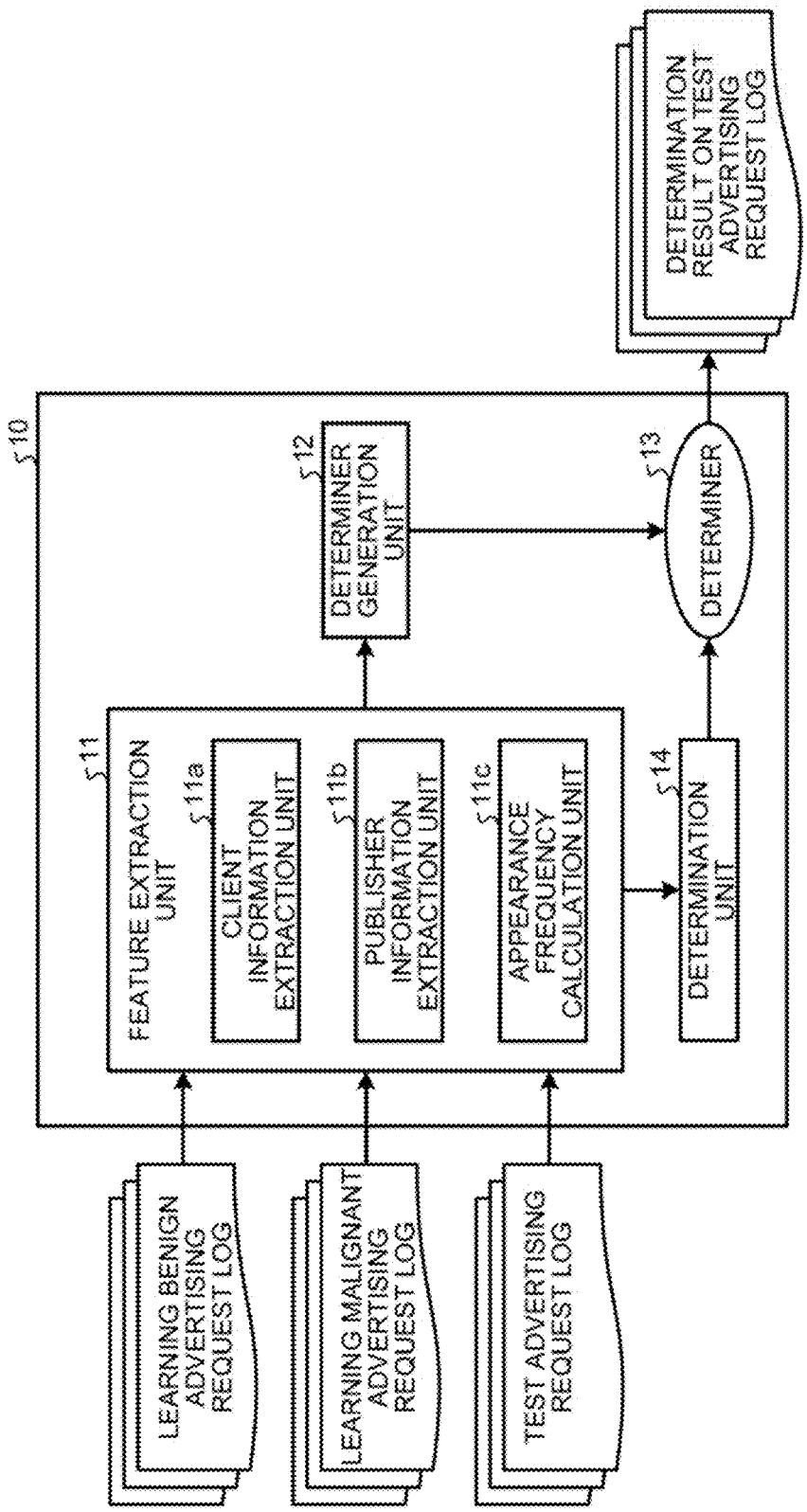

FIG.2

| CLIENT IP ADDRESS | USER AGENT | PUBLISHER URL |
|---|---|---|
| 198.51.100.15 | aaaaa/5.0 (bbbbb NT 6.1; ··· | https://example.com/... |
| 203.0.113.20 | aaaaa/5.0 (ccccc; ddddd 6.0; ··· | https://example.org/... |
| ··· | ··· | ··· |

| CLIENT IP ADDRESS | RESULT OF REVERSE DNS LOOKUP | CLIENT INFORMATION (rDNS-e2LD) |
|---|---|---|
| 198.51.100.15 | 15-100-51-198.ispX.example | ispX.example |
| 203.0.113.20 | 20.113.0.203.ispY.example | ispY.example |
| ··· | ··· | ··· |

(b)

| USER AGENT | CLIENT INFORMATION (OS-VERSION) |
|---|---|
| aaaaa/5.0 (bbbbb NT 6.1; ··· | bbbbb7 |
| aaaaa/5.0 (ccccc; ddddd 6.0; ··· | ddddd6.0 |
| ··· | ··· |

FIG.4

| PUBLISHER URL | PUBLISHER INFORMATION (FQDN) |
|---|---|
| https://example.com/... | example.com |
| https://example.org/... | example.org |
| ... | ... |

FIG.6

DETECTOR, DETECTION METHOD, AND DETECTION PROGRAM

CROSS-REFERENCE TO RELATED APPLICATIONS

The present application is based on PCT filing PCT/JP2019/015708, filed Apr. 10, 2019, which claims priority to JP 2018-179229, filed Sep. 25, 2018, the entire contents of each are incorporated herein by reference.

FIELD

The present invention relates to a detector, a detection method, and a detection program.

BACKGROUND

In recent years, with the development of markets, a damage caused by advertising fraud that targets online advertising is increasing. The online advertising is one of monetization methods in websites and mobile applications. In the online advertising, four kinds of stake holders, such as an end user, a publisher, an advertiser, and an advertising network, are mainly involved.

The end user views an online advertisement via a web browser or a mobile application. The publisher provides an advertiser with an advertisement display space that is prepared in a website or a mobile application managed by the publisher, and receives an advertising fee in exchange for provision of the advertisement display space. The advertiser places an advertisement. The advertising network has a role to broker transactions between the publisher and the advertiser.

Further, the advertising fraud is an attack that causes the advertiser to wastefully pay advertising fees by using a means that does not actually have an advertising effect. Normally, a web advertisement is displayed based on the assumption that the web advertisement is viewed and clicked by audience, such as an end user, who has accessed a website through a browser. In contrast, the attacker fraudulently swindle advertising fees by generating a fraudulent web traffic that does not have an advertising effect or causing automatic click to occur. For example, the attacker infects a terminal (client) used by the end user with adware, a potentially unwanted program (PUP), or the like, and causes an automatic advertising request to be issued from the infected client.

As a countermeasure for the advertising fraud as described above, a technique for detecting, from the advertising network side, an advertising request that is issued by advertising fraud has been examined. For example, a technique for detecting advertising fraud by using the fact that an advertising request issued by advertising fraud and advertising revenue caused by the advertising request have higher burstiness than that of an advertising request issued by a normal end user (see Non Patent Literatures 1 and 2).

CITATION LIST

Non Patent Literature

Non Patent Literature 1: B. Stone-Gross, R. Stevens, A. Zarras, R. Kemmerer, C. Kruegel, and G. Vigna, "Understanding Fraudulent Activities in Online Ad Exchanges", Proceedings of the 2011 ACM SIGCOMM Conference on Internet Measurement Conference (IMC), 2011, pp. 279-294

Non Patent Literature 2: V. Dave, S. Guha, and Y. Zhang, "ViceROI: Catching Click-Spam in Search Ad Networks", Proceedings of the 2013 ACM SIGSAC Conference on Computer and Communications Security (CCS), 2013, pp. 765-776

SUMMARY

Technical Problem

However, in the conventional techniques, in some cases, an attacker may prevent detection of advertising fraud. For example, an attacker is able to perform advertising fraud in a distributed manner by using a number of clients and publisher sites managed by the attacker. Further, in this case, the attacker is able to arbitrarily set the number of advertising requests and advertising revenue caused by the advertising requests for each of the clients and the publisher sites. Therefore, if the attacker sets the number of advertising requests and the advertising revenue to approximately the same values as those of a normal end user or a normal publisher site, it is difficult to detect advertising fraud using the conventional techniques based on the burstiness of an advertising request.

The present invention has been conceived in view of the foregoing situations, and an object of the present invention is to detect advertising fraud that is less likely to be prevented by an attacker.

Solution to Problem

To solve the above-described problem and to achieve an object, a detector comprising:

an extraction unit that extracts, from an advertising request as a request to view an online advertisement, client information on a client as a transmission source of the advertising request and publisher information on a website of a publisher who displays an advertisement, and calculates a predetermined feature amount using the client information and the publisher information with respect to a plurality of advertising requests including at least a benign advertising request; and a determiner generation unit that generates a determiner that determines whether an advertising request is malignant or not by using the calculated feature amount.

Advantageous Effects of Invention

According to the present invention, it is possible to detect advertising fraud that is less likely to be prevented by an attacker.

BRIEF DESCRIPTION OF DRAWINGS

FIG. 1 is a schematic diagram illustrating an overall configuration of a detector.

FIG. 2 is a diagram illustrating a data structure of an advertising request log.

FIG. 3 is an explanatory diagram for explaining client information.

FIG. 4 is an explanatory diagram for explaining publisher information.

FIG. 6 is an explanatory diagram for explaining the process performed by the feature extraction unit.

DESCRIPTION OF EMBODIMENTS

Figure 5:
FIG. 5 is an explanatory diagram for explaining a process performed by a feature extraction unit.

One embodiment of the present invention will be described in detail below with reference to the drawings. Meanwhile, the present invention is not limited by the embodiment below. Further, in description of the drawings, the same components are denoted by the same reference symbols.

Configuration of Detector

FIG. 1 is a schematic diagram illustrating an overall configuration of a detector. In a detector 10, a control unit that is implemented using a central processing unit (CPU) or the like of a general-purpose computer functions as a feature extraction unit 11, a determiner generation unit 12, and a determination unit 14 as illustrated in FIG. 1. Meanwhile, each or part of the functional units as described above may be implemented by different hardware. For example, the determination unit 14 may be implemented by different hardware from that of the feature extraction unit 11 and the determiner generation unit 12.

Further, in the detector 10, a determiner 13 is stored in a storage unit that is implemented by a storage device, e.g., a semiconductor memory element, such as a random access memory (RAM) or a flash memory, a hard disk, an optical disk, or the like.

The feature extraction unit 11 functions as an extraction unit. In other words, the feature extraction unit 11 extracts, from an advertising request as a request to view an online advertisement, client information on a client as a transmission source of the advertising request and publisher information on a web site of a publisher who displays an advertisement. Furthermore, the feature extraction unit 11 calculates a predetermined feature amount using the client information and the publisher information with respect to a plurality of advertising requests including at least a benign advertising request.

Specifically, the feature extraction unit 11 first receives input of an advertising request as a request to view an online advertisement, via an input unit, such as a keyboard, or via a communication control unit, such as a network interface card (NIC) (not illustrated). Here, FIG. 2 is a diagram illustrating a data structure of the advertising request. As illustrated in FIG. 2, the advertising request includes a client Internet protocol (IP) address, a user agent, a publisher uniform resource locator (URL), and the like.

The client IP address is an IP address of a client that is used by an end user who views the advertisement, that is, a client as a transmission source of the advertising request. The user agent is a user agent of software, hardware, or the like that is used by the client to view the advertisement. The publisher URL is a URL of a publisher's website on which the advertisement is displayed.

Meanwhile, the determiner generation unit 12 to be described later performs a process using a learning advertising request. As the learning advertising request, a learning malignant advertising request log and a learning benign advertising request log are used. The learning malignant advertising request log is a log of malignant advertising requests that are issued by advertising fraud. Further, the learning benign advertising request log is a log of benign advertising requests that are issued by activities of normal end users.

Furthermore, the determination unit 14 to be described later performs a process using a test advertising request log that is a test advertising request. The test advertising request log is a log of advertising requests that are targets for which determination on whether the advertising requests are malignant or not is performed.

Referring back to explanation of FIG. 1, the feature extraction unit 11 includes a client information extraction unit 11a, a publisher information extraction unit 11b, and an appearance frequency calculation unit 11c.

The client information extraction unit 11a extracts the client information on a client as a transmission source of an advertising request. Here, FIG. 3 is a diagram for explaining the client information.

For example, as illustrated in FIG. 3(a), the client information extraction unit 11a extracts, as the client information, information on a network to which the IP address of the transmission source of the advertising request belongs. Specifically, the client information extraction unit 11a performs reverse DNS lookup for resolving a domain name from the IP address by using a client UP address included in the advertising request. Then, the client information extraction unit 11a extracts, from the domain name that is a result of the reverse DNS lookup, a partial character string (hereinafter, described as rDNS-e2LD) representing a minimum unit of a part that is registerable on the Internet at the desire of a user, and adopts the partial character string as the client information.

For example, the client information extraction unit 11a refers to a well-known public suffix list, and extracts the rDNS-e2LD from the domain name. The public suffix represents a character string that is an upper level part of a domain name and that is not controllable by an individual user. Therefore, it is sufficient for the client information extraction unit 11a to extract, as the rDNS-e2LD, a part that is one or more level lower than the public suffix included in the domain name.

In the example illustrated in FIG. 3(a), in a case in which ".example" is included in the public suffix, the client information extraction unit 11a extracts, as the rDNS-e2LD, "ispX.example" and "ispY.example" from domains that are results of reverse DNS lookup.

As illustrated in FIG. 3(b), the client information extraction unit 11a may extract, as the client information, information on an operating environment of the client. Specifically, the client information extraction unit 11a extracts a character string (hereinafter, described as an operating system (OS)-version), in which a type of an OS and a major version number represented by the user agent are connected, by using the user agent included in the advertising request, and adopts the character string as the client information.

For example, the client information extraction unit 11a defines a signature for each of types of OS and versions in advance, and performs signature matching with a character string that represents the user agent. In other words, the client information extraction unit 11a identifies a signature corresponding to the user agent, and extracts a type of OS and a version number representing the user agent. Meanwhile, the client information extraction unit 11a is able to define the signature using uap-core that is open source software, for example.

In the example illustrated in FIG. 3(b), the client information extraction unit 11a extracts an OS-version of "bbbbb7" from a character string of "aaaaa/5.0(bbbbb NT 6.1; . . . " that represents the user agent.

The publisher information extraction unit 11b extracts publisher information related to a website of the publisher who displays an advertisement. Here, FIG. 4 is a diagram for explaining the publisher information. For example, as illustrated in FIG. 4, the publisher information extraction unit 11b extracts, as the publisher information, a domain name of the website of the publisher. Specifically, the publisher information extraction unit 11b extracts a fully qualified domain name (FQDN) of the publisher site from the publisher URL included in the advertising request, and adopts the FQDN as the publisher information.

The publisher information extraction unit 11b is able to extract the FQDN by eliminating, from the URL, a part representing a scheme, such as "http://", "https://", and a part representing a path name after a delimiter, such as "/". In the example illustrated in FIG. 4, the publisher information extraction unit 11b extracts an FQDN of "example.com" from a publisher URL of "https://example.com/ . . . ".

The appearance frequency calculation unit 11c calculates a predetermined feature amount using the client information and the publisher information with respect to a plurality of advertising requests including at least a benign advertising request. For example, the appearance frequency calculation unit 11c calculates a feature amount by using appearance frequencies of the client information and the publisher information in the plurality of advertising requests including at least a benign advertising request.

Here, FIG. 5 and FIG. 6 are explanatory diagrams for explaining processes performed by the feature extraction unit 11. First, FIG. 5 illustrates a process of calculating appearance frequencies of the client information and the publisher information.

The client information extraction unit 11a extracts the client information and the publisher information extraction unit 11b extracts the publisher information as illustrated in FIG. 5(b) from advertising requests as illustrated in FIG. 5(a).

In the example illustrated in FIG. 5(b), the publisher information extraction unit 11b extracts the FQDN as the publisher information. Further, the client information extraction unit 11a extracts the rDNS-e2LD and the OS-version as the client information. Meanwhile, the client information and the publisher information are not limited to this example. For example, the client information extraction unit 11a may extract only one of the rDNS-e2LD and the OS-version as the client information.

Subsequently, as illustrated in FIG. 5(c), the appearance frequency calculation unit 11c calculates appearance frequencies of the client information and the publisher information. Specifically, the appearance frequency calculation unit 11c first tallies up the client information and the publisher information of each of the advertising requests illustrated in FIG. 5(b). For example, the appearance frequency calculation unit 11c acquires a list of unique values that appear in all of the advertising requests for each of the rDNS-e2LD, the OS-version, and the FQDN. Further, the appearance frequency calculation unit 11c acquires a list of combinations of unique values that appear in the same advertising requests, for each of three kinds of combinations, such as a combination of the rDNS-e2LD and the FQDN, a combination of the rDNS-e2LD and the OS-version, and a combination of the OS-version and the FQDN.

Then, the appearance frequency calculation unit 11c calculates an appearance frequency of each of the values or the combinations of the values in the acquired lists, in all of the advertising requests illustrated in FIG. 5(a). Meanwhile, the appearance frequency may be the number of appearances in all of the advertising requests, or a value obtained by normalizing the number of appearances between 0 to 1. In the example illustrated in FIG. 5(c), both of the number of appearances and the normalized value are calculated. For example, the number of appearances of the combination of the OS-version of "bbbbb7" and the FQDN of "example.com" in all of the advertising requests is 2, so that the appearance frequency is calculated as 2 and the normalized appearance frequency is calculated as 0.285.

Subsequently, the appearance frequency calculation unit 11c calculates a feature amount using the calculated appearance frequency. Here, FIG. 6 illustrates a process of calculating the feature amount using the appearance frequency that is calculated as illustrated in FIG. 5. As illustrated in FIG. 6, the appearance frequency calculation unit 11c generates, as the feature amount of each of the advertising requests, a feature vector composed of the appearance frequencies of the client information and the publisher information of each of the advertising requests by using the calculated appearance frequencies.

For example, a feature vector as illustrated in FIG. 6(d) is generated by using the appearance frequencies that are calculated as illustrated in FIG. 6(a) with respect to the client information and the publisher information that are extracted as illustrated in FIG. 6(c) from the advertising request as illustrated in FIG. 6(b).

In the example illustrated in FIG. 6, the feature vector of each of the advertising requests is generated using, as components, appearance frequencies of all of the values in order of (the rDNS-e2LD, the OS-version, the FQDN, the combination of the rDNS-e2LD and the FQDN, the combination of the rDNS-e2LD and the OS-version, and the combination of the OS-version and the FQDN). Meanwhile, the order is not specifically limited as long as the order is common to all of the advertising requests.

For example, the feature vector illustrated in FIG. 6(d) is a 6-dimensional vector that is generated using, as components, values of normalized appearance frequencies that are indicated by hatching in FIG. 6(a). In other words, the feature vector is generated by using appearance frequencies of the rDNS-e2LD of "ispX.example", the OS-version of "bbbbb7", the FQDN of "example.com", and the combination of all of the rDNS-e2LD, the OS-version, and the FQDN in a record of the advertising request log illustrated in FIG. 6(b).

As described above, the feature extraction unit 11 calculates the feature amount with respect to a number of advertising requests including a benign advertising request. In other words, the feature extraction unit 11 calculates a feature amount of each of advertising requests by using a statistical trend of advertising requests that are issued by normal end users. It is difficult for an attacker to manipulate the statistical trend caused by the normal end users, so that the feature amount with respect to a number of advertising requests including a benign advertising request as described above is a value that can hardly be manipulated by the attacker.

The determiner generation unit 12 generates the determiner 13, which determines whether an advertising request is malignant or benign, by using the calculated feature amount. Specifically, for example, the determiner generation unit 12 learns assignment of a malignant label to a malignant advertising request by using a malignant feature vector that is calculated from the learning malignant advertising request log and by using a benign feature vector that is calculated from the learning benign advertising request log. Accordingly, the determiner generation unit 12 generates the determiner 13 that assigns one of the malignant label and a benign label to an advertising request.

The determination unit 14 determines whether the advertising request is malignant or not by using the generated determiner 13. Specifically, the determination unit 14 inputs, to the determiner 13, a predetermined feature amount that is calculated for the test advertising request log by the feature extraction unit 11. Meanwhile, for example, if the number of records included in the test advertising request log is small, the appearance frequency calculation unit 11c of the feature extraction unit 11 may adopt an appearance frequency value that is calculated for the learning advertising request log, and calculate the feature amount of each of the advertising requests.

If the determiner 13 assigns the malignant label to the test advertising request log, the determination unit 14 determines that the test advertising request is malignant. Further, if the determiner 13 assigns the benign label to the test advertising request log, the determination unit 14 determines that the test advertising request is benign, that is, not malignant.

Detection Process

Figure 7:
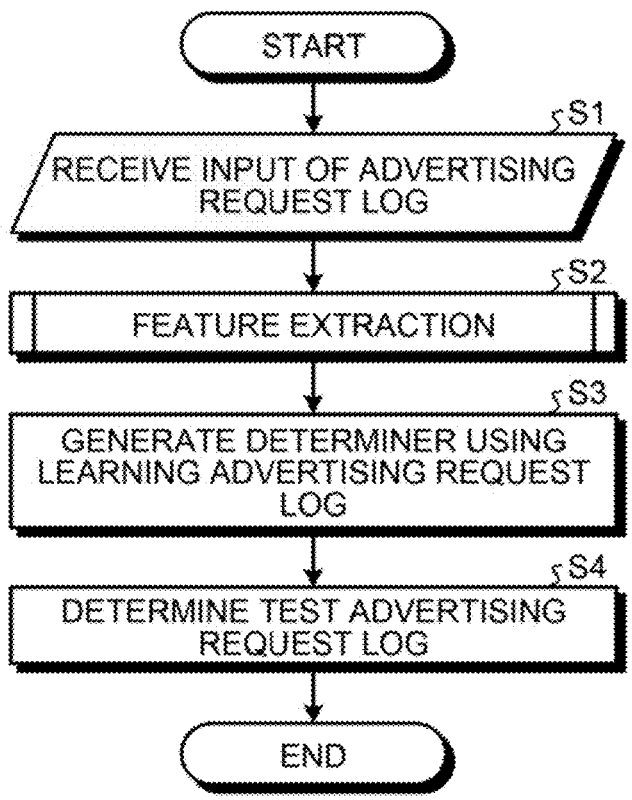
FIG. 7 is a flowchart illustrating the flow of a detection process.

Next, a detection process performed by the detector 10 according to the present embodiment will be described with reference to FIG. 7 and FIG. 8. FIG. 7 is a flowchart illustrating the flow of the detection process. The flowchart in FIG. 7 starts at a timing at which a user inputs operation of giving an instruction to start the detection process, for example.

First, if the feature extraction unit 11 receives input of an advertising request log (Step S1), the feature extraction unit 11 performs a feature extraction process for each of the advertising requests. In other words, the feature extraction unit 11 calculates a predetermined feature amount using the client information and the publisher information with respect to all of the input advertising requests (Step S2).

The determiner generation unit 12 determines the determiner 13 that determines whether the advertising request log is malignant or not, by using the feature amount that is calculated for the learning advertising request log (Step S3). In other words, the determiner generation unit 12 generates the determiner 13 that assigns either the malignant label or the benign label to the advertising requests, by using a malignant feature amount that is calculated from the learning malignant advertising request log and a benign feature amount that is calculated from the learning benign advertising request log.

Further, the determination unit 14 determines whether the test advertising request log is malignant or not by inputting the feature amount calculated for the test advertising request log to the generated determiner 13 (Step S4). Thus, a series of the detection processes is terminated.

Figure 8:
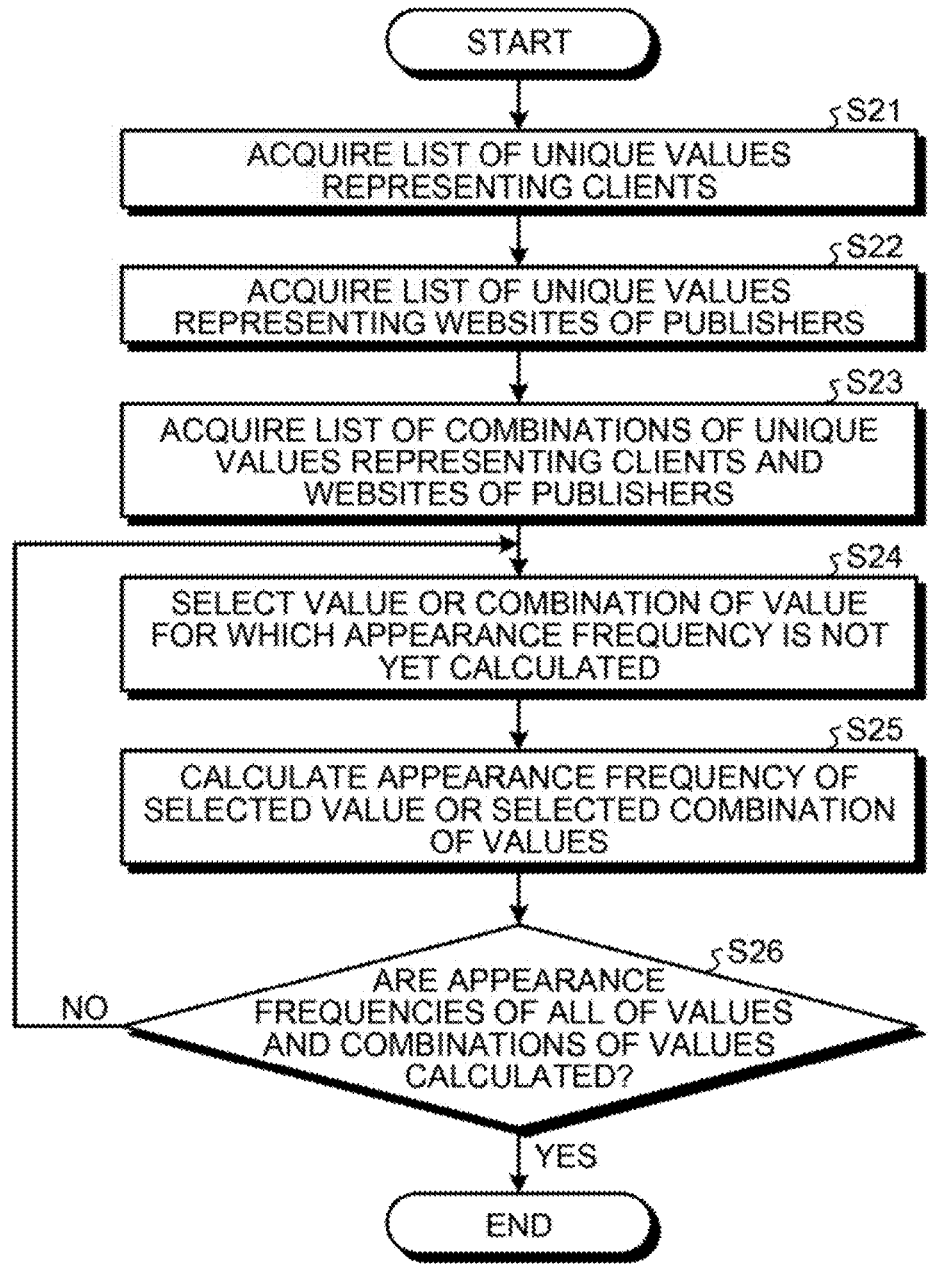
FIG. 8 is a flowchart illustrating the flow of a feature extraction process.

Furthermore, FIG. 8 is a flowchart illustrating the flow of the feature extraction process (Step S2 described above). In the feature extraction unit 11, the client information extraction unit 11a extracts the client information indicating clients from advertising requests. Then, the appearance frequency calculation unit 11c acquires a list of unique values of the client information that appear in all of the input advertising requests (Step S21).

Moreover, the publisher information extraction unit 11b extracts the publisher information indicating websites of publishers from the advertising requests. Then, the appearance frequency calculation unit 11c acquires a list of unique values of the publisher information that appear in all of the input advertising requests (Step S22).

Furthermore, the appearance frequency calculation unit 11c acquires a list of combinations of unique values of the client information and the publisher information that appear in the same advertising requests (Step S23).

The appearance frequency calculation unit 11c sequentially selects a value or a combination of values from the acquired list (Step S24), and calculates, as the feature amount, the appearance frequency of the selected value or the selected combination of values that appears in all of the advertising requests (Step S25).

The appearance frequency calculation unit 11c repeats the process of calculating the appearance frequency of a value and a combination of values in the list (if No at Step S26, Step S24 is performed). Then, if the appearance frequency calculation unit 11c calculates the appearance frequencies of all of the values and the combinations of values in the list (Yes at Step S26), a series of the feature extraction processes is terminated.

Thus, as described above, in the detector 10 according to the present embodiment, the feature extraction unit 11 extracts, from an advertising request as a request to view an online advertisement, the client information on a client as a transmission source of the advertising request and publisher information on a website of a publisher who displays the advertisement, and calculates a predetermined feature amount using the client information and the publisher information with respect to a plurality of advertising requests including at least a benign advertising request. Further, the determiner generation unit 12 generates the determiner 13, which determines whether an advertising request is malignant, by using the calculated feature amount.

Here, conventionally, for example, the number of advertising requests or a click through rate (CTR) that has occurred for each of users who view advertisements and for each of publisher sites, and advertising fraud is detected based on burstiness of a calculated value (see Non Patent Literature 1). Further, advertising fraud is detected by using the fact that advertising revenue caused by advertising fraud is higher than advertising revenue caused by a normal publisher (see Non Patent Literature 2). In this manner, conventionally, advertising fraud is detected by using the fact that an advertising request issued by advertising fraud and advertising revenue caused by the advertising request have higher burstiness than that of an advertising request issued by a normal end user.

In contrast, in the detector 10 of the present embodiment, the feature extraction unit 11 calculates a feature amount with respect to a number of advertising requests including a benign advertising request that is issued by a normal end user, for each of advertising requests. In other words, the feature extraction unit 11 calculates a feature amount of each of the advertising requests by using a statistical trend of benign advertising requests. For example, the feature extraction unit 11 calculates a feature amount using appearance frequencies of the client information and the publisher information in a number of advertising requests including a benign advertising request that is issued by a normal end user.

Meanwhile, the feature extraction unit 11 extracts, as the client information, information on a network to which an IP address of a transmission source of an advertising request belongs, and calculates the feature amount using the client information. Alternatively, the feature extraction unit 11 extracts, as the client information, information on an operating environment of the client, and calculates the feature amount using the client information. Furthermore, the feature extraction unit 11 extracts, as the publisher information, a domain name of a website of a publisher, and calculates the feature amount using the publisher information.

It is difficult for an attacker to manipulate the statistical trend that is caused by normal end user. Even if the attacker performs an attack using a number of clients or websites of publishers, it is difficult to set feature amounts of the clients or the websites of the publishers to the same values as those of advertising requests issued by normal end users. Therefore, the feature amount with respect to a number of advertising requests including a benign advertising request as described above has a value that can hardly be manipulated by the attacker.

In this manner, the detector 10 of the present embodiment generates the determiner 13 that determines whether an advertising request is malignant or not by using a feature amount that can hardly be manipulated by an attacker. The determination unit 14 determines whether an advertising request is malignant by using the determiner 13 generated as described above. Therefore, the detector 10 is able to detect advertising fraud that can hardly be prevented by an attacker.

Program

It is possible to generate a program in which a process performed by the detector 10 according to the embodiment as described above is written in a computer-executable language. As one embodiment, the detector 10 may be implemented by installing, as package software or online software, a detection program for executing the detection process as described above in a desired computer. For example, by causing an information processing apparatus to execute the detection program as described above, it is possible to cause the information processing apparatus to function as the detector 10. The information processing apparatus described herein includes a desktop personal computer or a notebook personal computer. Further, in addition to the above, the information processing apparatus includes a mobile communication terminal, such as a smartphone or a personal handy-phone system (PHS), a slate terminal, such as a personal digital assistant (PDA), and the like. Further, the functions of the detector 10 may be implemented on a cloud server.

Figure 9:
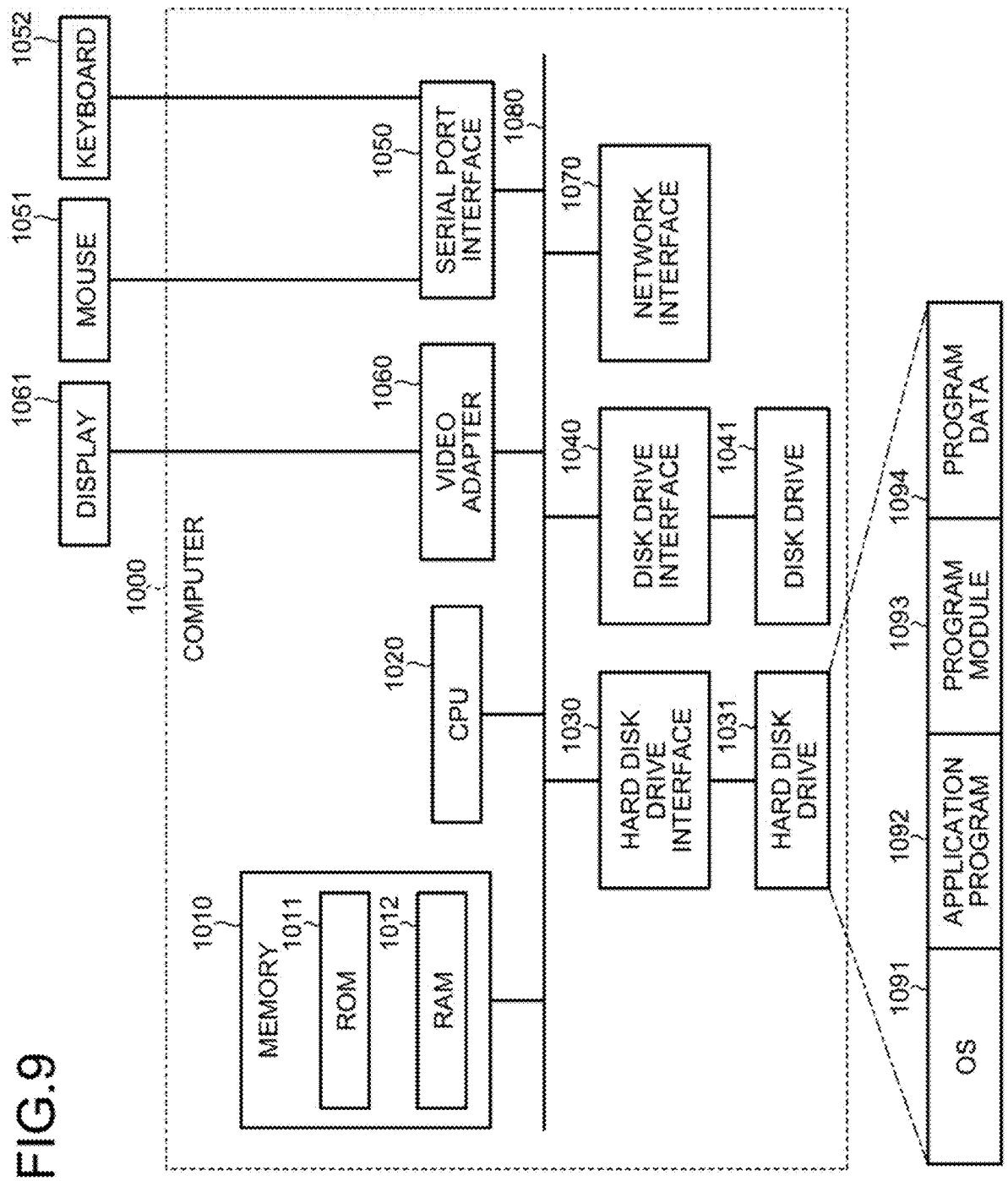
FIG. 9 is a diagram illustrating an example of a computer that executes a detection program.

FIG. 9 is a diagram illustrating an example of a computer that executes the detection program. A computer 1000 includes, for example, a memory 1010, a CPU 1020, a hard disk drive interface 1030, a disk drive interface 1040, a serial port interface 1050, a video adapter 1060, and a network interface 1070. All of the above units are connected to one another via a bus 1080.

The memory 1010 includes a read only memory (ROM) 1011 and a random access memory (RAM) 1012. The ROM 1011 stores therein, for example, a boot program, such as basic input output system (BIOS). The hard disk drive interface 1030 is connected to a hard disk drive 1031. The disk drive interface 1040 is connected to a disk drive 1041. A removable storage medium, such as a magnetic disk or an optical disk, is inserted into the disk drive 1041, for example. A mouse 1051 and a keyboard 1052 are connected to the serial port interface 1050, for example. A display 1061 is connected to the video adapter 1060, for example.

Here, the hard disk drive 1031 stores therein, for example, an OS 1091, an application program 1092, a program module 1093, and program data 1094. Each piece of the information described in the above embodiment is stored in, for example, the hard disk drive 1031 or the memory 1010.

Furthermore, the detection program is stored, as the program module 1093, in which a command executed by the computer 1000 is written, in the hard disk drive 1031, for example. Specifically, the program module 1093, in which each of the processes performed by the detector 10 described in the above embodiment is written, is stored in the hard disk drive 1031.

Moreover, data used for information processing caused by the detection program is stored, as the program data 1094, in the hard disk drive 1031, for example. Then, the CPU 1020 reads the program module 1093 or the program data 1094 stored in the hard disk drive 1031 onto the RAM 1012 as needed basis, and performs each of the procedures as described above.

Meanwhile, the program module 1093 and the program data 1094 according to the detection program need not always by stored in the hard disk drive 1031, but may be stored in, for example, a removable storage medium and read by the CPU 1020 via the disk drive 1041 or the like. Alternatively, the program module 1093 and the program data 1094 according to the detection program may be stored in a different computer that is connected via a network, such as a local area network (LAN) or a wide area network (WAN), and read by the CPU 1020 via the network interface 1070.

Thus, the embodiment to which the invention made by the present inventors is applied has been described above, but the present invention is not limited by the descriptions and the drawings as parts of the disclosure of the present invention described in the present embodiment. In other words, other embodiments, examples, operation techniques, and the like that are thought of by a person skilled in the art based on the present embodiment are included in the scope of the present invention.

REFERENCE SIGNS LIST

10 detector
11 feature extraction unit
11*a* client information extraction unit
11*b* publisher information extraction unit
11*c* appearance frequency calculation unit
12 determiner generation unit
13 determiner
14 determination unit

The invention claimed is:

1. A detector comprising:
a memory; and
a processor coupled to the memory and programmed to execute a process comprising:
extracting, from an advertising request as a request to view an online advertisement, client information on a client as a transmission source of the advertising request and publisher information on a website of a publisher who displays an advertisement, and using the extracted client information and publisher information to calculate a predetermined feature amount representing statistical information with respect to a plurality of advertising requests including at least a benign advertising request issued by an authorized end user, the plurality of advertising requests comprising advertising requests from a plurality of clients and a plurality of publisher sites;
performing a reverse DNS lookup for each of the clients:
generating a determiner that determines whether an advertising request is malignant or not by using the calculated feature amount, in accordance with a learning malignant advertising request log and a learning benign advertising request log; and detecting advertising fraud in accordance with the determiner, wherein the extracting includes:

acquiring a list of unique values of the client information and the publisher information that appear in all of the advertising requests, or a list of combinations of unique values of the client information of the plurality of clients and the publisher information of the plurality of publisher sites that appear in the same advertising requests; and calculating the feature amount by using an appearance frequency of each of the values or the combinations of the values in the acquired lists, in all of the advertising requests, and wherein the client information includes the reverse DNS lookup and operating system (OS) identity;

the publisher information includes a domain name of each of the plurality of publisher sites; and the feature amount is calculated by using an appearance frequency of each of the reverse DNS lookup, the OS identity, and the domain name of a publisher site; or using an appearance frequency of each of a combination of the reverse DNS lookup and the domain name of the publisher, a combination of the reverse DNS lookup and the OS identity, and a combination of the OS identity and the domain name of the publisher.

2. The detector according to claim 1, wherein the extracting further includes extracting, as the client information, information on a network to which an Internet protocol (IP) address of a transmission source of the advertising request belongs, and calculating the feature amount.

3. The detector according to claim 1, wherein the extracting further includes extracting, as the client information, information on an operating environment of the client, and calculating the feature amount.

4. The detector according to claim 1, wherein the extracting further includes extracting, as the publisher information, a domain name of a website of the publisher, and calculating the feature amount.

5. A detection method performed by a detector, the detection method comprising:

extracting, from an advertising request as a request to view an online advertisement, client information on a client as a transmission source of the advertising request and publisher information on a website of a publisher who displays advertising, and using the extracted client information and publisher information to calculate a predetermined feature amount representing statistical information with respect to a plurality of advertising requests including at least a benign advertising request issued by an authorized end user, the plurality of advertising requests comprising advertising requests from a plurality of clients and a plurality of publisher sites;

performing a reverse DNS lookup for each of the clients;

generating a determiner that determines whether an advertising request is malignant or not by using the calculated feature amount, in accordance with a learning malignant advertising request log and a learning benign advertising request log; and detecting advertising fraud in accordance with the determiner, wherein the extracting includes:

acquiring a list of unique values of the client information and the publisher information that appear in all of the advertising requests, or a list of combinations of unique values of the client information of the plurality of clients and the publisher information of the plurality of publisher sites that appear in the same advertising requests; and calculating the feature amount by using an appearance frequency of each of the values or the combinations of the valves in the acquired lists, in all of the advertising requests, and wherein the client information includes reverse DNS lookup and operating system (OS) identity;

the publisher information includes a domain name of each of the plurality of publisher sites; and the feature amount is calculated by using an appearance frequency of each of the reverse DNS lookup, the OS identity, and the domain name of a publisher site; or using an appearance frequency of each of a combination of the reverse DNS lookup and the domain name of the publisher, a combination of the reverse DNS lookup and the OS identity, and a combination of the OS identity and the domain name of the publisher.

6. A non-transitory computer-readable recording medium including a detection program that causes a computer to execute:

extracting, from an advertising request as a request to view an online advertisement, client information on a client as a transmission source of the advertising request and publisher information on a website of a publisher who displays advertising, and using the extracted client information and publisher information to calculate a predetermined feature amount representing statistical information with respect to a plurality of advertising requests including at least a benign advertising request issued by an authorized end user, the plurality of advertising requests comprising advertising requests from a plurality of clients and a plurality of publisher sites;

performing a reverse DNS lookup for each of the clients;

generating a determiner that determines whether an advertising request is malignant or not by using the calculated feature amount, in accordance with a learning malignant advertising request log and a learning benign advertising request log; and detecting advertising fraud in accordance with the determiner, wherein the extracting includes:

acquiring a list of unique values of the client information and the publisher information that appear in all of the advertising requests, or a list of combinations of unique values of the client information of the plurality of clients and the publisher information of the plurality of publisher sites that appear in the same advertising requests; and calculating the feature amount by using an appearance frequency of each of the values or the combinations of the values in the acquired lists, in all of the advertising requests, and wherein the client information includes reverse DNS lookup and operating system (OS) identity;

the publisher information includes a domain name of each of the plurality of publisher sites; and the feature amount is calculated by using an appearance frequency of each of the reverse DNS lookup, the OS identity, and the domain name of a publisher site; or using an appearance frequency of each of a combination of the reverse DNS lookup and the domain name of the publisher a combination of the reverse f NS lookup and the OS identity, and a combination of the OS identity and the domain name of the publisher.

\* \* \* \* \*